(No Model.)
C. N. DENNETT.
JUMP SEAT CARRIAGE.
No. 324,306. Patented Aug. 11, 1885.
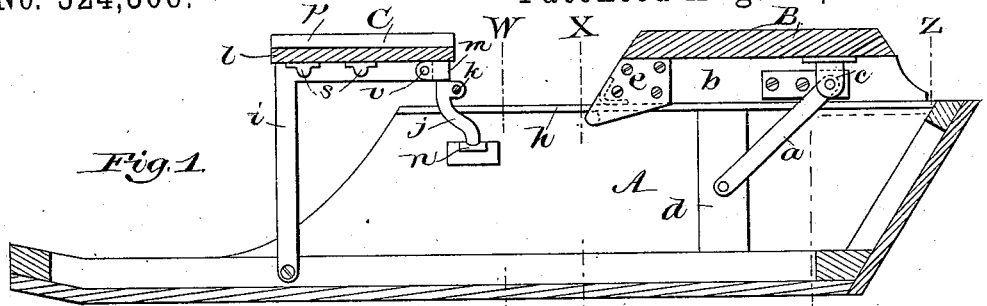
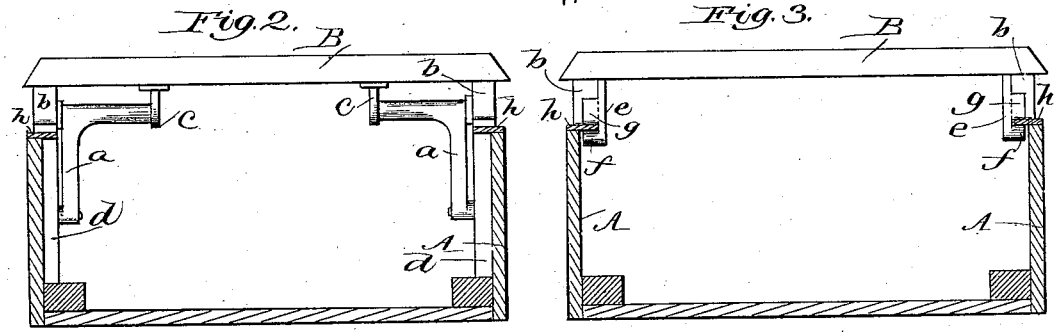
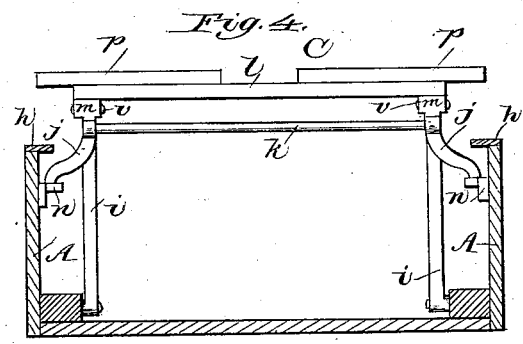
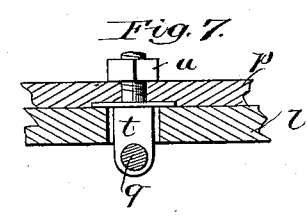
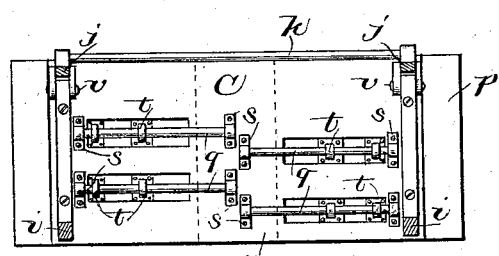
Witnesses
S. N. Corthell
Eugene Humphrey
Inventor
Charles N. Dennett
per Porter & Hutchinson
Attys

UNITED STATES PATENT OFFICE.

CHARLES N. DENNETT, OF SALISBURY, MASSACHUSETTS.

JUMP-SEAT CARRIAGE.

SPECIFICATION forming part of Letters Patent No. 324,306, dated August 11, 1885.

Application filed March 30, 1885. (No model.)

*To all whom it may concern:*

Be it known that I, CHARLES N. DENNETT, of Salisbury, in the county of Essex and State of Massachusetts, have invented a new and useful Improvement in Jump-Seat Carriages, which will, in connection with the accompanying drawings, be hereinafter fully described, and specifically defined in the appended claims.

This invention has for its object certain improvements in jump-seat carriages; and it will, in connection with the accompanying drawings, be hereinafter fully described and particularly and distinctly claimed.

In said drawings, Figure 1 is a sectional elevation of a carriage-body embodying my invention, the section being vertical, longitudinal, and central, and the elevation as viewed from the left-hand side of the vehicle. Fig. 2 is also a sectional elevation, the section being taken as on line Z Z, Fig. 1, and the elevation as viewed from the right therein. Fig. 3 is a similar view, the section being taken as on line X X, Fig. 1, and the view being from the left therein. Fig. 4 is a similar view, the section being taken as on line W W, Fig. 1, and the view as in Fig. 2. Fig. 5 is a detached side elevation showing the locking devices at the front corners of the rear seat. Fig. 6 is an under side plan view of the front seat. Fig. 7 is an enlarged detached transverse section showing telescopic devices of the front seat.

In said views, A represents the side of the body. B is the rear seat, and C the front seat, all which may be of any style or pattern. The rear of seat B is connected to the body by means of jumping-irons $a$, which at their lower ends are pivoted in standards $d$, secured to panels A, or in any suitable manner, while their upper end or angle is pivoted to base $b$ and hanger $c$, secured to the seat. Nothing is claimed as new in and of these jumping-irons; nor do I confine myself thereto, as other kinds are available in my invention.

The front corners of the rear seat I secure to the body by means of a metallic plate, $e$, secured to base $b$, and formed with a stud, $f$, and curved cam-like flange $g$, arranged with such space between them, and in such relative position, as shown, that when the rear of the seat rests on cap-iron $h$, secured on side A of the body, said stud and flange will grip the cap-iron between them; but when the rear of the seat is raised by jumping-irons $a$ said stud will be some distance below the cap-iron, and the front of the seat will slide thereon by the contact therewith of the flange $g$. It will thus be seen that the rear seat is jumped as respects its rear part, while it slides as regards its front part; that the jumping-irons control its position when in either a front or rear position, and that the guiding and locking irons $e$ at all times secure the seat from turning backward from any cause whatever; and this compound movement of this seat, the jump and sliding movement, and the guiding and locking irons $e$ constitute my improvement as relates to the rear seat.

The front seat, C, is supported at its front edge by angle-irons $i\ i$, pivoted in the usual manner to the sill of the body, and rigidly secured by their horizontal or upper arm to the bottom $l$ of the seat. The rear of this seat is supported by angle-irons $j\ j$, rigidly united by rod $k$, by means of which they are simultaneously vibrated on their pivots $v$, by which they are secured to the rear end of the upper arm of standards $i$. These standards $j$ extend rearward from pivots $v$ a sufficient distance, as indicated at $m$, Fig. 1, to insure their correct position when opened out to their full limit, so that their feet will enter their socketed seats or steps $n$ when the seat is lowered into place.

Two sections, $p\ p$, of a supplemental seat-bottom are arranged on bottom $l$, and are secured in position by means of eyebolts $t$, which move in longitudinal slots in $l$, and are secured to sections $p$ by screw-nuts $u$, or by screws, rivets, or otherwise. The rods $q$, passing through eyebolts $t$, are secured in place on bottom $l$ by socketed cap $s$, and are arranged to extend but half the length between standards $j$, and with the sections of the front and rear rods, respectively, out of line, in order that if it becomes necessary to remove either section $p$ for repairs or otherwise it may be done by removing only one cap, $s$, (at the inner end of the two rods,) when the rods may be slid out of bolts $t$, and section $p$, thus liberated, may then be removed, leaving the other secured, as before. By means of the telescopic sections $p$ seat C may be rendered as wide as seat B when raised for use, and yet it may be narrow enough to turn down in the body, like an ordinary turn-down seat.

If desired, the rear irons, $j$, may be of such length that sockets $n$ may be arranged directly under cap-irons $h$.

Front seat, C, can be turned down forward, and by folding down the rear irons, $j$, egress from and ingress to the vehicle at the cut-down portion thereof is then convenient, when by opening out the irons $j$ to the extent permitted by angle $m$ they will automatically enter steps $n$ when the seat is lowered.

I claim as my invention—

1. A carriage-seat having a pair of jumping-irons connected therewith, and adapted to raise one edge or part thereof, and an automatic guiding and locking device secured to the opposite edge, whereby the seat is in part raised by the jumping-irons, and is located or positioned thereby when in place, and is guided when being jumped by the irons that lock the front edge when in position for use, substantially as specified.

2. The locking-irons $e$, formed with stud $f$ and flange $g$, and arranged to clamp cap-iron $h$ when the seat rests thereon, and to slide freely thereon when the seat is being raised and jumped, substantially as specified.

3. The combination of seat B, jumping-irons $a\ a$, locking and guiding irons $e\ e$, and cap-irons $h\ h$, all constructed and combined to operate substantially as specified.

4. The combination, with front seat, C, and its front standards, $i$, rigidly secured thereto and pivotally connected with the body, and the socket $n$, secured to the panel, of rear standards, $j$, formed with angle $m$, and pivoted to the seat at the front end thereof, and a bar, $k$, rigidly uniting said standards, to insure their simultaneous vibratory movement, substantially as specified.

5. A carriage-seat formed with a supplemental or upper bed or bottom transversely divided, and adapted and arranged to be extended and retracted on each side of the seat, substantially as specified.

6. The combination of lower seat-bottom, $l$, upper sections, $p\ p$, rods $q$, and eyebolts $t$, all substantially as specified.

7. In combination with bottom $l$ and upper sections, $p\ p$, the rods $q$, transversely divided and offset or arranged out of line, substantially as specified.

C. N. DENNETT.

Witnesses:
C. L. ALLEN,
GEORGE M. BRIGGS.